Oct. 4, 1949. G. L. EDWARDS 2,483,763
SLICING BOARD WITH PARALLEL KNIFE GUIDES
Filed Oct. 19, 1946
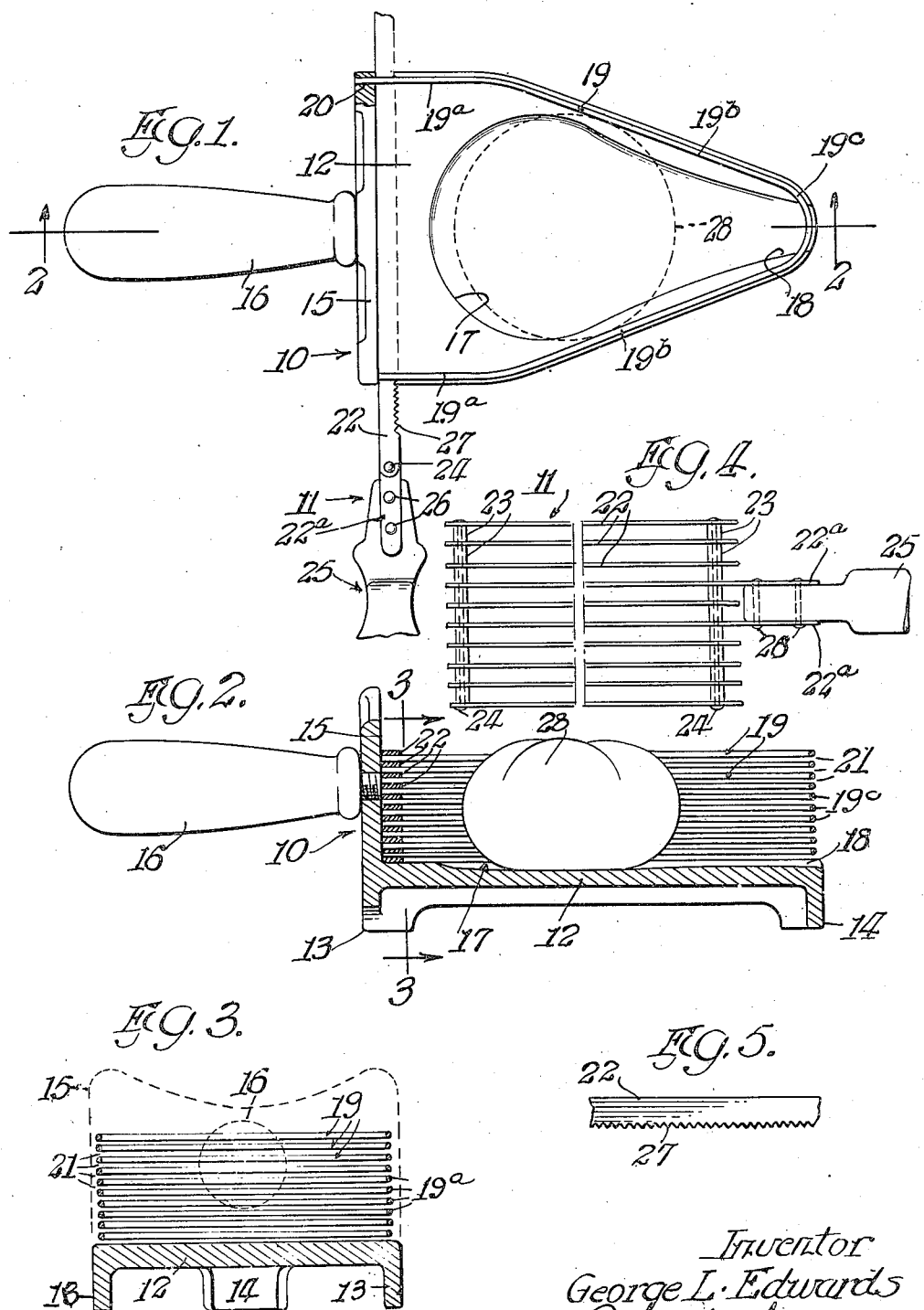
Inventor
George L. Edwards Patented Oct. 4, 1949

2,483,763

UNITED STATES PATENT OFFICE 2,483,763

SLICING BOARD WITH PARALLEL KNIFE GUIDES

George L. Edwards, Alexandria, La.

Application October 19, 1946, Serial No. 704,477

2 Claims. (Cl. 146—150)

This invention relates to improvements in slicing apparatus and it consists of the matters hereinafter described and more particularly pointed out in the appended claims. The invention is more especially concerned with a hand operated apparatus for use in the kitchen of a home and in establishments serving food, for slicing certain fruits and vegetables.

One of the objects of the invention is to provide a simple hand operated apparatus for quickly and evenly cutting into a plurality of stacked slices, in one operation, certain food items for table service and other uses.

Also it is an object of the invention to provide a slicing apparatus which functions upon sliceable food items of a number of different sizes, to hold the same in a position whereby the slicing thereof in one operation may be better accomplished.

Again, it is an object of the invention to provide apparatus of this kind, which may be easily kept in a sanitary condition by washing in hot water.

Furthermore, it is an object of the invention to provide apparatus of this kind, especially adapted for cutting a tomato, in one operation, into slices that are not bruised or mashed, for serving, and this with but a minimum loss of the juice therefrom.

Again, it is an object of the invention to provide apparatus of the kind which includes a slicing knife of novel construction, adapted for cutting a sliceable food item into a plurality of slices in one operation.

The above mentioned objects of the invention, as well as other, together with the advantages thereof, will more fully appear as the specification proceeds.

In the drawing:

Fig. 1 is a top plan view of a slicing apparatus embodying the preferred form of the invention.

Fig. 2 is longitudinal sectional view through the same as taken on the line 2—2 of Fig. 1.

Fig. 3 is a transverse vertical sectional view through a part of the improved slicing apparatus as taken on the line 3—3 of Fig. 2.

Fig. 4 is a view in side elevation of the end portions of a multiple blade knife forming a part of the apparatus and which will more fully be described later.

Fig. 5 is a view in elevation, on a somewhat enlarged scale, of a fragment of one of the blades of the knife, appearing in Fig. 4 and which will be more fully mentioned later.

In general, the improved apparatus comprises but two operating parts, namely a supporting base for the food item to be sliced and a cutting or slicing knife. The supporting plate includes a plurality of substantially U or V shaped guides, arranged one spaced above the other in a stack and which guides have supporting engagement at one end from an upstanding part on one end of the base. The knife comprises a plurality of thin strip-like blades arranged one above the other in a spaced relation to accord with the spaces between the guides for a sliding engagement on the guides with a slicing movement from a position in back of the item toward and through the item and finally out of engagement with converging parts of the guide to leave the slices in a stacked relation upon the supporting base. By reason of the construction of the guides, the items need not be of a uniform size nor need they be placed in any particular position on the supporting base because in the movement of the knife, it first positions the item in engagement with parts of the guide to be held thereby, and thereafter cuts through the item, leaving a stacked pile of slices thereof disposed in a position on the base for convenient removal therefrom.

Referring now in detail to that embodiment of the invention illustrated in the accompanying drawing, the apparatus comprises primarily a holder 10 for the food item to be sliced and a multiple bladed knife 11, for use with the holder 10.

The holder 10 embodies therein a generally horizontal base 12 on the general shape of a sad iron, being wider along the sides at the rear end and converging along the sides toward the front end of the base. The base is provided at the rear and front ends with supporting feet 13 and 14, and rising from the rear end of the base is an upright transverse flange or wall 15.

A handle 16 is fixed to and extends rearwardly from the flange 15 on the medial line of the base. In the top surface of the base is a shallow recess 17 to receive the item to be sliced. A juice drain duct 18 joins with said recess to open through the front end of the base. The handle 16 forms a convenient means for grasping the holder 10, as during a slicing operation, and the duct 18 forms a convenient means for pouring the juice from the base, after a slicing operation.

The holder 10 also includes a plurality of vertically spaced guides 19 of the same general shape as that part of the base forwardly of the flange 15, as best appears in Fig. 1.

The guides 19 are counterparts and are preferably made of relatively stiff wire of a circular cross section. Each guide includes a pair of arms, the rear end portions 19a of which are laterally spaced and are parallel with each other and the front end portions 19b of said arms converge toward each other and are joined together by a rounded end portion 19c. The rear end of the arm portions 19a of the guides are engaged and suitably fixed in openings 20 (see Fig. 1) in the upright margins of the flange 15.

With the guides arranged in vertically superposed spaced apart relation, as best appears in Figs. 2 and 3, there is defined between each two adjacent guides, a knife blade receiving space 21, best appearing in Figs. 3 and 4.

The knife 11, before mentioned, embodies a plurality of superposed knife blades 22—22 that are spaced apart vertically to accord with the receiving spaces 21 therefor, between the guides 19, before mentioned. Said blades are preferably in the form of thin relatively narrow spring metal strips of a length greater than the transverse width of the rear end of the base 12 and said blades are held in the desired spaced relation toward their ends by means of spacer sleeves 23, rivets 24 extending through said blades and sleeves.

One convenient way to provide a handle, by which the knife may be manipulated during a slicing operation, is to make two non-adjacent blades of a length greater than the others so as to extend beyond one end thereof, as extensions 22a, as best appears in Fig. 4. The inner end of a handle 25 is disposed between said blade extensions 22a and is fixed thereto as by the rivets 26, which best appear in Fig. 4. Preferably each blade 22 is serrated along at least one edge, as best shown at 27 in Fig. 5, although both edges may be so serrated.

The apparatus may be used to advantage for slicing certain food items, such as fruits and vegetables and is especially useful when slicing tomatoes, which ordinarily are difficult to slice evenly without bruising the same and without losing much of the valuable juices thereof.

To slice a tomato with the apparatus shown and described herein, the knife 11 is applied to the holder from the front end thereof, so that the blades 22 are each disposed in a space 21. By reason of making the guides 19 of relatively stiff wire, they maintain their spaced position at the corner or junction 19c and as they have a round cross section, they function to guide each blade into its own space, when the knife is first engaged with said corners. After the blades have entered the spaces 21, the knife as a whole is moved rearwardly so that the blades stop against the flange 15 with the serrated edges of the blades facing forwardly, as best appears in Fig. 1.

A tomato, indicated at 28, is then placed in the recess 17 of the base, forwardly of the knife so that the base and guides form a holding cage therefor. The knife 11, when grasped by the handle 25, is moved forwardly on the guides 19, with a back and forth reciprocating motion, toward the tomato, with the serrated edges of the blades facing the same. If the tomato is relatively smaller than the distance between the parts 19a of the guides, the action of the knife, when manipulated, is to first engage the tomato to move or press it into engagement with the converging portions 19b of the guides. This will firmly hold the same in a position wherein the serrated edges of the blade will simultaneously cut through the skin and then the pulp of the tomato, to thereafter pass out through the spaces at the front end of the guides for a complete separation from the holder 10. The tomato remains in the holder as a stack of separated slices and which may be discharged from the holder merely by turning the holder into an inverted position, using the handle 16 for this purpose. The knife may now be replaced in the holder ready for another operation.

The apparatus is simple in construction, is easy to use for its intended purpose, and may be kept in a clean sterilized condition between periods of use, by washing in hot water.

While in describing my invention I have referred in detail to the form, arrangement and construction of the parts embodied therein, the same is to be considered only in the illustrative sense so that I do not wish to be limited thereto except as may be specifically set forth in the appended claims.

I claim as my invention:

1. Slicing apparatus embodying therein a substantially horizontal base having a recess in its upper surface for receiving a sliceable item and a juice drain leading from said recess through a part of the edge of said base, upright means at one end of the base, a plurality of vertically spaced blade guides arranged above said base, each guide including laterally spaced guide arms having supporting engagement at one end with said upright means and converging toward the other end, said upright means and said arms forming a confining cage for the sliceable item in the recess on said base, and a cutting device adapted for use with said arms and including a plurality of relatively fixed cutting blades vertically spaced to accord with the spaces between said arms and adapted to be positioned in said spaces for guided engagement with said arms, said blades when moved longitudinally and transversely in guided engagement upon said arms away from said upright means first engaging said item in said recess and pressing it into holding engagement with the converging parts of said arms and then passing through said item to cut the same into slices.

2. In a slicing apparatus for use with a gang slicer comprising a plurality of relatively fixed, spaced cutting blades formed to act as a unit: said apparatus comprising a readily portable base, blade guide supporting means carried by said base; a plurality of blade guides disposed at an angle to said blade guide supporting means; spaced from each other and overlying said base in parallel fixed relation; each of said guides including spaced arm portions; each of the latter supported at one end of each in cantilever fashion upon said blade guide supporting means; the remaining ends of each pair of said arm portions being integral with the ends of substantially V-shaped arm portions to form obtuse angles therewith; the angular ends of said V-portions being freely separated from the adjacent like portions whereby to support and enclose an object to be sliced while lying on said base and to retain the object against thrust imparted thereto by a gang slicer moving toward the apex of the V-portions and escaping therebetween, leaving the slices of the object intact and portable with the apparatus for discharge by inversion of the apparatus.

GEORGE L. EDWARDS.

REFERENCES CITED

The following references are of record in the file of this patent:

UNITED STATES PATENTS

| Number | Name | Date |
|---|---|---|
| 1,213,681 | Norton | Jan. 23, 1917 |
| 1,470,783 | Vincent | Oct. 16, 1923 |
| 1,866,960 | Zimmer | July 12, 1932 |
| 2,058,766 | Blumenkranz et al. | Oct. 27, 1936 |
| 2,413,160 | Witmer | Dec. 24, 1946 |

FOREIGN PATENTS

| Number | Country | Date |
|---|---|---|
| 176,960 | Germany | Dec. 8, 1906 |
| 179,015 | Switzerland | Aug. 31, 1935 |
| 356,280 | Germany | July 19, 1922 |